United States Patent
Kusumoto et al.

(10) Patent No.: US 6,528,212 B1
(45) Date of Patent: Mar. 4, 2003

(54) LITHIUM BATTERY

(75) Inventors: Yasuyuki Kusumoto, Moriguchi (JP); Masahisa Fujimoto, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/659,595

(22) Filed: Sep. 11, 2000

(30) Foreign Application Priority Data

| Sep. 13, 1999 | (JP) | 11/258627 |
| Sep. 13, 1999 | (JP) | 11/258627 |
| Sep. 13, 1999 | (JP) | 11/258628 |

(51) Int. Cl.$^7$ .............................................. H01M 4/64
(52) U.S. Cl. ............... 429/233; 429/231.1; 429/231.95; 429/245
(58) Field of Search ................... 429/231.4, 231.1, 429/233, 231.95, 245

(56) References Cited

U.S. PATENT DOCUMENTS

| 5,006,428 A | 4/1991 | Goebel et al. | 429/101 |
| 5,446,005 A * | 8/1995 | Endo | 423/447.2 |
| 5,476,734 A * | 12/1995 | Pulley et al. | 429/123 |
| 5,484,669 A * | 1/1996 | Okuno et al. | 429/199 |
| 5,756,232 A | 5/1998 | Kelly et al. | 429/232 |
| 5,965,054 A * | 10/1999 | McEwen et al. | 252/182.1 |

FOREIGN PATENT DOCUMENTS

| JP | 60-28170 | * | 2/1985 |
| JP | 01-163970 | | 6/1989 |
| JP | 03-241675 | | 10/1991 |
| JP | 11-3713 | | 1/1999 |
| JP | 2000-40510 | * | 2/2000 |
| JP | 2000-106218 | * | 4/2000 |
| WO | WO99/27594 | | 6/1999 |

* cited by examiner

Primary Examiner—Laura Weiner
(74) Attorney, Agent, or Firm—Armstrong, Westerman & Hattori, LLP

(57) ABSTRACT

A lithium battery of the invention includes a positive electrode, a negative electrode with a negative electrode current collector retaining lithium metal, and a nonaqueous electrolyte, wherein an activated carbon or graphitized carbon is used as the negative electrode current collector.

13 Claims, 2 Drawing Sheets

LITHIUM BATTERY

BACKGROUND OF THE INVENTION

1. Field of the Invention

The present invention relates to a lithium battery comprising a positive electrode, a negative electrode and a nonaqueous electrolyte and more particularly, to a lithium battery adapted for dissolution and deposition of lithium metal in the negative electrode, the battery directed to a suppressed formation of lithium dendrite on the negative electrode and to a suppressed reaction between the lithium metal in the negative electrode and a solvent in the nonaqueous electrolyte in the lithium dissolution/deposition process associated with the charging and discharging of the battery.

2. Description of the Related Art

As a novel secondary battery of high power and high energy density, a lithium battery have gained widespread use. Such a battery employs the nonaqueous electrolyte and is capable of being charged and discharged through oxidation/reduction of lithium.

This lithium battery uses a variety of negative-electrode materials for forming the negative electrode.

Where lithium metal is employed as the negative-electrode material, the battery can achieve the highest theoretical capacity of 3.86 Ah/g. Accordingly, studies have been made on the use of lithium metal as the negative-electrode material.

However, if the lithium battery employing lithium metal as the negative-electrode material is subjected to repeated charging/discharging processes involving lithium-metal dissolution/deposition in the negative electrode, the negative electrode encounters a gradual growth of lithium dendrite thereon. The lithium dendrite will further grow through a separator to come into contact with the positive electrode. Furthermore, the dendrite growth leads to an increased contact area between the lithium metal of the negative electrode and the solvent of the nonaqueous electrolyte so that the lithium metal of the negative electrode is more likely to react the solvent of the nonaqueous electrolyte. As a result, the lithium battery is decreased in the charge/discharge efficiency and hence in the cycle performance.

More recently, Japanese Unexamined Patent Publication No.11-3713(1999) has proposed a lithium battery employing a negative electrode collector formed from a porous material, such as carbon, for suppression of the formation of lithium dendrite during charging and discharging of the lithium battery.

Unfortunately, the lithium battery with the negative electrode collector formed from the porous material, such as carbon, still suffers the drawback that the charge/discharge efficiency is decreased due to the reaction between the solvent or the like in the nonaqueous electrolyte and the lithium metal retained at the negative electrode collector or the porous material, such as carbon, forming the negative electrode collector.

SUMMARY OF THE INVENTION

A first object of the invention is to prevent the growth of lithium dendrite on the negative electrode during charging/discharging of the lithium battery adapted for the dissolution/deposition of lithium metal in the negative electrode.

A second object of the invention is to prevent the reaction between the lithium metal in the negative electrode and the solvent in the nonaqueous electrolyte in the lithium battery adapted for the dissolution/deposition of lithium metal in the negative electrode.

A third object of the invention is to enhance the charge/discharge efficiency and thence the cycle performance of the lithium battery adapted for the dissolution/deposition of lithium metal in the negative electrode.

In accordance with a first aspect of the invention, a lithium battery comprises a positive electrode, a negative electrode with a negative electrode collector retaining lithium metal, and a nonaqueous electrolyte, wherein an activated carbon with a minimum pore size in the range of 5 Å to 16 Å is used as the negative electrode collector.

In accordance with a second aspect of the invention, a lithium battery comprises a positive electrode, a negative electrode with a negative electrode collector retaining lithium metal, and a nonaqueous electrolyte, wherein an activated carbon with a specific surface area in the range of 960 $m^2/g$ to 2000 $m^2/g$ is used as the negative electrode collector.

With the minimum pore size of 5 Å, the activated carbon used as the negative electrode collector has a specific surface area of about 960 $m^2/g$. With the minimum pore size of 16 Å, the activated carbon used as the negative electrode collector has a specific surface area of about 2000 $m^2/g$.

If the activated carbon with the minimum pore size in the range of 5 Å to 16 Å and the specific surface area in the range of 960 $m^2/g$ to 2000 $m^2/g$ is used for forming the negative electrode collector of the negative electrode, as in the lithium batteries of the first and second aspects hereof, lithium ions with the solvent desorbed therefrom are inserted into the activated carbon pores so as to be deposited as lithium metal in the activated carbon pores when the lithium battery is charged for lithium metal retention at the negative electrode collector. Thus, the growth of lithium dendrite on the negative electrode is suppressed while the lithium metal deposited in the activated carbon pores is prevented from reacting the solvent in the nonaqueous electrolyte. Hence, the lithium battery is not degraded in the charge/discharge efficiency, accomplishing the improved cycle performance.

If the negative electrode collector is formed from the activated carbon with the minimum pore size of less than 5 Å, lithium ions are not readily inserted in the activated carbon pores, resulting in the deposition of lithium metal on the surface of the activated carbon.

Consequently, the lithium dendrite is formed on the negative electrode or the lithium metal of the negative electrode is in contact with the solvent in the nonaqueous electrolyte, reacting the same. If, on the other hand, the negative electrode collector is formed from the activated carbon with the minimum pore size in excess of 16 Å, solvated lithium ions are inserted into the activated carbon pores to be deposited as lithium metal. The resultant lithium metal is in contact with the solvent and the like of the nonaqueous electrolyte infiltrating into the activated carbon pores and the reaction therebetween occurs. Hence, both of the above cases entail the decreased charge/discharge efficiency and thence, the degraded cycle performance of the lithium battery.

The activated carbon for use in the negative electrode collector may take any form of grains, fibers and the like so long as the aforementioned properties are esented. However, a fibrous activated carbon may be preferred from the standpoint of easy handling when used for forming the negative electrode collector.

In accordance with a third aspect of the invention, a lithium battery comprises a positive electrode, a negative electrode with a negative electrode collector retaining lithium metal, and a nonaqueous electrolyte, wherein a graphitized carbon is used as the negative electrode collector.

If the graphitized carbon is used as the negative electrode collector as in the lithium battery of the third aspect hereof, the lithium dendrite growth on the negative electrode is suppressed during charging of the lithium battery for lithium metal retention at the negative electrode collector. In addition, the negative electrode collector is prevented from reacting the solvent and the like in the nonaqueous electrolyte during charging. Thus, the lithium battery is improved in the charge/discharge efficiency.

Where graphitized carbon is used as the negative electrode collector, the higher the graphitization degree of the graphitized carbon, the greater the effect of suppressing the reaction between the negative electrode collector and the solvent and the like in the nonaqueous electrolyte during charging. The graphitized carbon having spacing $d_{002}$ of lattice planes (002) in the range of 3.35 Å to 3.43 Å or more preferably of 3.35 Å to 3.36 Å, or containing crystallite whose size along the c-axis length (Lc) is not less than 40 Å or more preferably of not less than 700 Å, in particular, may be employed to achieve an even greater suppression of the reaction between the negative electrode-collector and the solvent and the like in the nonaqueous electrolyte during charging. Thus, the lithium battery is further improved in the charge/discharge efficiency.

It is noted that the lithium batteries of the first to third aspects hereof are characterized by the negative electrode collectors for use in the negative electrode and therefore, no particular restriction is posed on the positive electrode or the nonaqueous electrolyte of the lithium batteries.

The above lithium batteries may employ any of the known positive electrode materials conventionally used in the art. For example, metal oxides capable of absorbing and desorbing lithium ions are usable, including metal oxides containing at least one of manganese, cobalt, nickel, iron, vanadium, niobium and the like, and lithium-containing transition metal oxides such as lithium-containing $LiCoO_2$, $LiNiO_2$, $LiMn_2O_2$ and the like. Particularly if any one of the above lithium-containing transition metal oxides is used as the positive electrode material, the lithium in the transition metal oxide is retained by the negative electrode collector, negating the need for previously providing a lithium metal portion retained by the negative electrode collector. Therefore, the lithium battery may be fabricated without using lithium metal.

The above lithium batteries may employ, as the nonaqueous electrolyte, any of the known nonaqueous electrolytic solutions comprising a solvent and a solute dissolved therein, and of gel or solid state polymeric electrolytes.

The nonaqueous electrolyte may employ any of the known solvents commonly used in the art. Examples of a usable solvent include organic solvents such as ethylene carbonate, propylene carbonate, butylene carbonate, vinylene carbonate, cyclopentanone, sulfolane, dimethylsulfolane, 3-methyl-1,3-oxazolidine-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyl tetrahydrofuran, 1,3-dioxolane, methyl acetate, ethyl acetate and the like. These solvents may be used either alone or in combination of two or more types.

Any of the known solutes commonly used in the art may be dissolved in the above solvent. Examples of a usable solute include lithium compounds such as lithium trifluoromethanesulfonate $LiCF_3SO_3$, lithium hexafluorophosphate $LiPF_6$, lithium perchlorate $LiClO_4$ lithium tetrafluoroborate $LiBF_4$, lithium trifluoromethanesulfonimide $LiN(CF_3SO_2)_2$ and the like.

Any of the known polymers commonly used in the art are usable as the gel or solid state polymeric electrolyte.

Examples of a usable polymer include polyethylene oxide, polypropylene oxide, crosslinked polyethylene glycol diacrylate, crosslinked polypropylene glycol diacrylate, crosslinked polyethylene glycol methylether acrylate, crosslinked polypropylene glycol methylether acrylate and the like.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Lithium batteries according to embodiments of the invention will be described in detail with reference to the accompanying drawings. It is to be noted that the lithium batteries of the invention should not be limited to the following embodiments and suitable modifications may be made thereto within the scope of the invention.

First Embodiment

Figure 1:
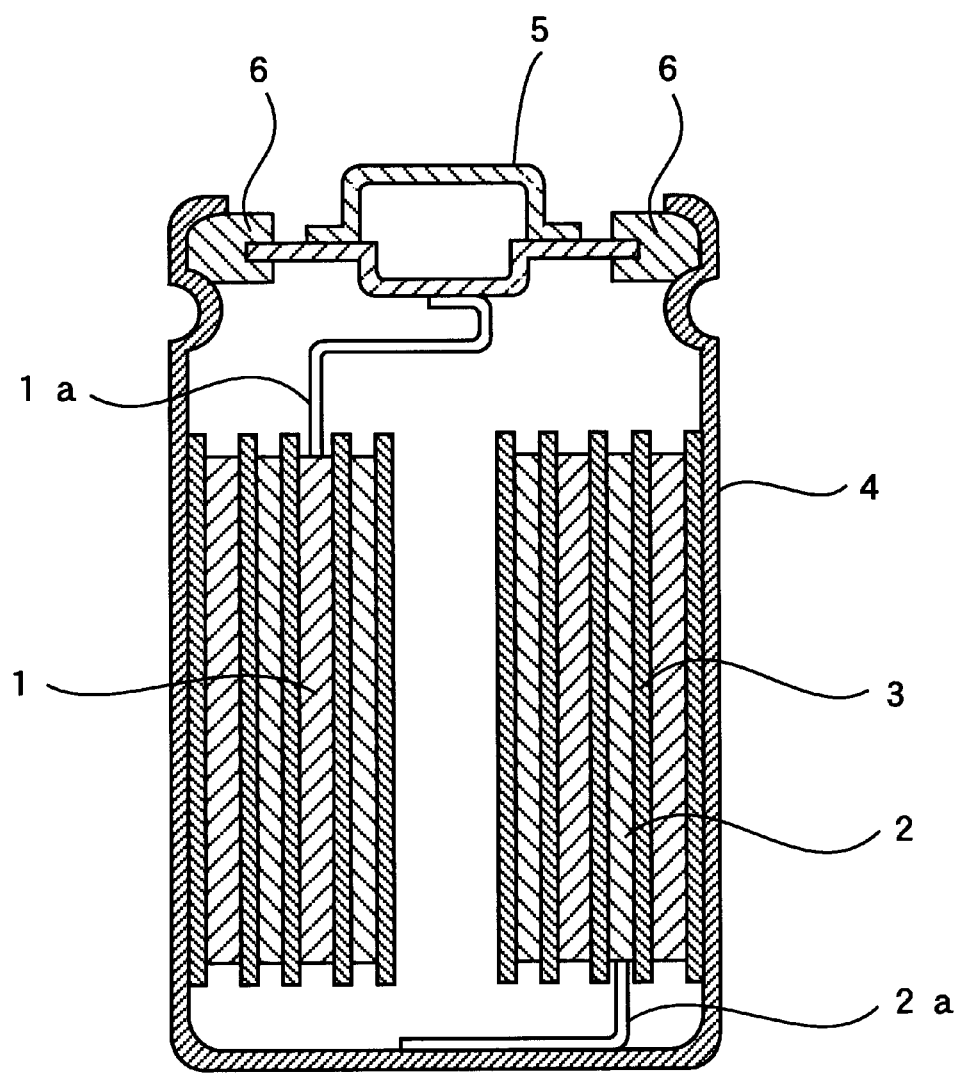
FIG. 1 is a schematic sectional view showing an internal construction of a lithium battery according to an embodiment of the invention.

As shown in FIG.1, a lithium battery according to a first embodiment is constructed such that a positive electrode 1 and a negative electrode 2 with a lithium-ion permeable separator 3 interposed therebetween are spirally wound into a roll, which is accommodated in a battery can 4.

In the lithium battery of the first embodiment, a negative electrode collector of the negative electrode 2 is formed from an activated carbon having a minimum pore size in the range of 5 Å to 16 Å and a specific surface area in the range of 960 $m^2/g$ to 2000 $m^2/g$.

A nonaqueous electrolyte is poured into the battery can 4 which is sealed. The positive electrode 1 is connected to a positive-electrode external terminal 5 via a positive-electrode lead 1a whereas the negative electrode 2 is connected to the battery can 4 via a negative-electrode lead 2a. The positive-electrode external terminal is electrically isolated from the battery can 4 by means of an insulation packing 6.

Although illustrated by the cylindrical lithium battery as shown in FIG. 1, the first embodiment may be applied to a flat-type lithium battery constructed such that the positive electrode and the negative electrode with the separator interposed therebetween are accommodated in a flat battery can, the separator impregnated with the nonaqueous electrolyte.

Test 1

Figure 2:
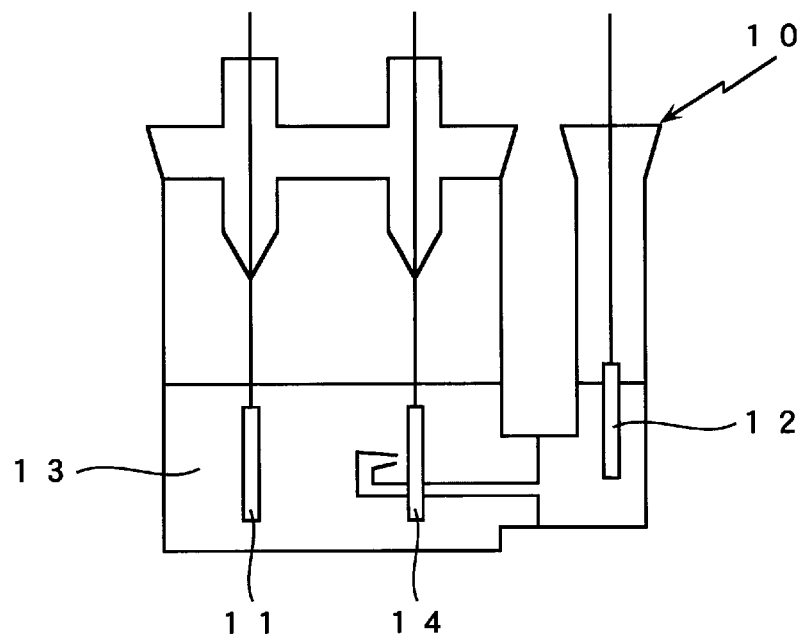
FIG. 2 is a schematic diagram illustrating a test cell used in experiments of the invention.

Test 1 was conducted using a test cell 10 shown in FIG. 2, a work electrode 14 of which was embodied in various types of negative electrode collectors. The test aimed at demonstrating by way of comparative examples that illustrative examples hereof using, in the work electrode 14, activated carbons with minimum pore sizes of 5 Å to 16 Å and specific surface areas of 960 m²/g to 2000 m²/g are increased in the charge/discharge efficiency.

In Test 1, the test cell 10 included a counter electrode 11 of lithium metal and a reference electrode 12 of lithium metal and contained therein a nonaqueous electrolyte 13 comprised of a solvent mixture containing ethylene carbonate and dimethyl carbonate in a volume ratio of 1:1, and lithium hexafluorophosphate $LiPF_6$ dissolved in the solvent mixture in a concentration of 1 mol/l.

As to the work electrode 14, Example A1 used an activated carbon fiber with a minimum pore size of 5 Å and a specific surface area of 960 m²/g; Example A2 used an activated carbon fiber with a minimum pore size of 12 Å and a specific surface area of 1500 m²/g; and Example A3 used an activated carbon fiber with a minimum pore size of 16 Å and a specific surface area of 2000 m²/g. On the other hand, Comparative Example X1 used a 20 μm-thick copper foil with a 200 μm-thick coating of a mixture containing acetylene black with a specific surface area of 100 m²/g and polyvinylidene fluoride in a weight ratio of 95:5. Comparative Example X2 used an activated carbon fiber with a minimum pore size of 22 Å and a specific surface area of 2300 m²/g; Comparative Example X3 used a 20 μm-thick copper foil; and Comparative Example X4 used a 20 μm-thick nickel foil.

Each of the work electrodes 14 was assembled in the test cell to determine the charge/discharge efficiency based on the cyclic voltammetry. The results are shown in FIG. 3.

The charge/discharge efficiency was determined as follows. Each test cell was charged and discharged in cycles, each cycle consisting of charging from the natural potential of about 3000 mV to −100 mV at a potential sweep rate of −10 mV/min, followed by discharging to the natural potential of about 3000 mV at a potential sweep rate of +10 mV/min. The charge capacity and discharge capacity at cycle 5 were taken to calculate the charge/discharge efficiency based on the following equation:

Charge/discharge efficiency=(Discharge capacity÷Charge capacity)×100

Figure 3:
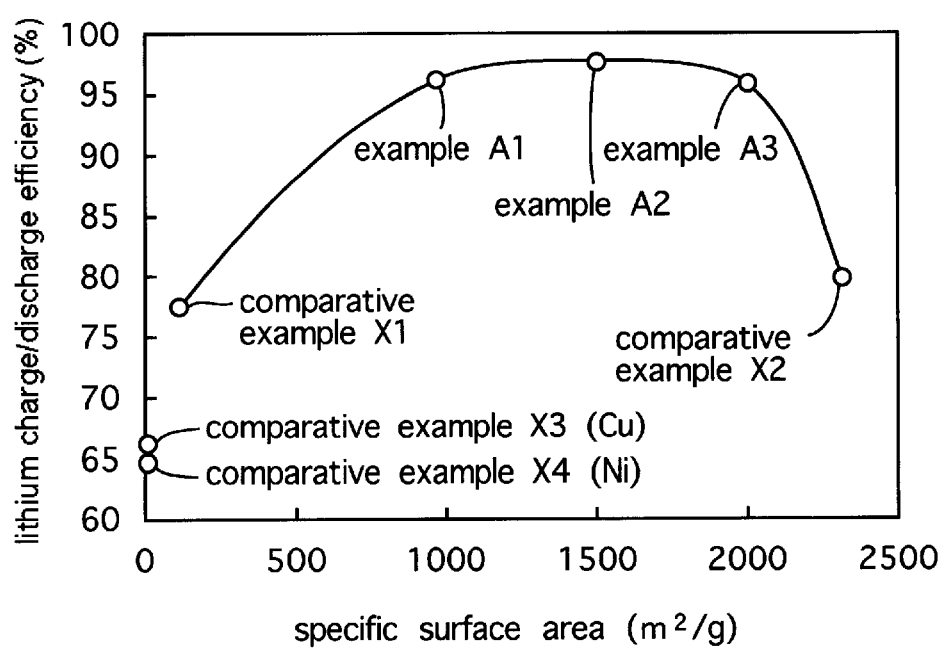
FIG. 3 is a graphical representation of the relationship between the specific surface area of activated carbon used in Test 1 for forming a work electrode of the test cell and the charge/discharge efficiency.

As indicated by the results shown in FIG. 3, Examples A1 to A3 employing, as the work electrode 14, the activated carbon fibers with the minimum pore sizes of 5 Å to 16 Å and the specific surface areas of 960 m²/g to 2000 m²/g are dramatically improved in the charge/discharge efficiency as compared with Comparative Example X1 employing acetylene black with the specific surface area of 100 m²/g, Comparative Example X2 employing the activated carbon fiber with the, minimum pore size of 22 Å and the specific surface area of 2300 m²/g, or Comparative Examples X3 and X4 employing the copper foil piece and nickel foil piece respectively.

The lithium battery can achieve the high charge/discharge efficiency by employing the negative electrode collector formed from the activated carbon fiber with the minimum pore size in the range of 5 Å to 16 Å and the specific surface area in the range of 960 m²/g to 2000 m²/g, as demonstrated by Examples A1 to A3. Thus, the lithium battery is improved in the cycle performance.

Second Embodiment

A lithium battery of a second embodiment is also constructed such that the positive electrode 1 and the negative electrode 2 with the lithium-ion permeable separator 3 interposed therebetween are spirally wound into the roll which is accommodated in the battery can 4, as shown-in FIG. 1.

In the lithium battery of the second embodiment, graphitized carbon is used for forming the negative electrode collector of the negative electrode 2.

Although illustrated by the cylindrical lithium battery as shown in FIG. 1, the second embodiment may also be applied to a flat-type lithium battery constructed such that the positive electrode and the negative electrode with the separator interposed therebetween are accommodated in a flat battery can, the separator impregnated with the nonaqueous electrolyte.

Test 2

Test 2 was conducted using the test cell 10 shown in FIG. 2, the work electrode 14 of which was embodied in various types of negative electrode collectors. The test aimed at demonstrating by way of comparative examples that illustrative examples hereof using graphitized carbon in the work electrode 14 are improved in the charge/discharge efficiency.

Similarly to Test 1, the test cell 10 used in Test 2 included the counter electrode 11 of lithium metal and the reference electrode 12 of lithium metal and contained therein the nonaqueous electrolyte 13 comprised of the solvent mixture containing ethylene carbonate and dimethyl carbonate in a volume ratio of 1:1, and lithium hexafluorophosphate $LiPF_6$ dissolved in the solvent mixture in a concentration of 1 mol/l.

As to the work electrode 14, Example B1 used a 20 μm-thick copper foil with a 200 μm-thick coating of a mixture on one side thereof, the mixture prepared by the steps of sintering acetylene black at 2800° C. for giving a graphitized carbon with a $d_{002}$ of 3.431 Å and an Lc of 87 Å, and blending together the resultant graphitized carbon and polyvinylidene fluoride in a weight ratio of 95:5. Example B2 used a 20 μm-thick copper foil with a 200 μm-thick coating of a mixture on one side thereof, the mixture prepared by the steps of sintering ketjen black at 2800° C. for giving a graphitized carbon with a $d_{002}$ of 3.357 Å and an Lc of 712 Å, and blending together the resultant graphitized carbon and polyvinylidene fluoride in a weight ratio of 95:5. Example B3 used a graphitized carbon fiber with a $d_{002}$ of 3.419 Å and an Lc of 40 Å obtained by sintering an activated carbon fiber at 2800° C. Example B4 used a 20 μm-thick copper foil with a 200 μm-thick coating of a mixture on one side thereof, the mixture prepared by blending together a natural graphite with a $d_{002}$ of 3.350 Å and an Lc of 1000 Å and polyvinylidene fluoride in a weight ratio of 95:5.

On the other hand, Comparative Example Y1 used a 20 μm-thick copper foil with a 200 μm-thick coating of a mixture on one side thereof, the mixture prepared by blending together acetylene black with a $d_{002}$ of 3.480 Å and an Lc of 12 Å and polyvinylidene fluoride in a weight ratio of 95:5. Comparative Example Y2 used an activated carbon fiber with a $d_{002}$ of 3.490 Å and an Lc of 10 Å.

Each of the work electrodes 14 was assembled in the test cell to determine the charge/discharge efficiency based on the cyclic voltammetry. The results are shown in Table 1 as below.

The charge/discharge efficiency was determined as follows. Each test cell was charged and discharged in cycles, each cycle consisting of charging from the natural potential of about 3000 mV to −100 mV at a potential sweep rate of −10 mV/min, followed by discharging to the natural potential of about 3000 mV at a potential sweep rate of +10 mV/min. The charge capacity and discharge capacity at cycle 1 were taken to calculate the charge/discharge efficiency based on the following equation:

Charge/discharge efficiency (%)=(Discharge capacity÷Charge capacity)×100

TABLE 1

| | properties of carbon material used as work electrode | | charge/discharge efficiency (%) |
|---|---|---|---|
| | $d_{002}$ (Å) | Lc (Å) | |
| example B1 | 3.431 | 87 | 81.8 |
| example B2 | 3.357 | 712 | 85.7 |
| example B3 | 3.419 | 40 | 82.2 |
| example B4 | 3.350 | 1000 | 86.2 |
| comparative example Y1 | 3.480 | 12 | 59.8 |
| comparative example Y2 | 3.490 | 10 | 58.0 |

As apparent from the results, Examples B1 to B4 employing the graphitized carbon with the $d_{002}$ of 3.35 Å to 3.431 Å and the Lc of not less than 40 Å as the carbon material for forming the work electrode 14 are dramatically improved in the charge/discharge efficiency as compared with Comparative Examples Y1 and Y2 individually using the ungraphitized acetylene black and activated carbon fiber with the $d_{002}$ and the Lc out of the above ranges.

The lithium battery can achieve the marked improvement in the charge/discharge efficiency by using the graphitized carbon like those of Examples B1 to B4 in the negative electrode collector of the negative electrode.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. A lithium battery comprising a positive electrode, a negative electrode with a negative electrode current collector retaining lithium metal, and a nonaqueous electrolyte, wherein an activated carbon with a minimum pore size in the range of 5 Å to 16 Å is used as said negative electrode current collector.

2. The lithium battery as claimed in claim 1, wherein a fibrous activated carbon is used as said negative electrode current collector.

3. The lithium battery as claimed in claim 1, wherein said positive electrode employs a lithium-containing transition metal oxide as a positive-electrode material.

4. A lithium battery comprising a positive electrode, a negative electrode with a negative electrode current collector retaining lithium metal, and a nonaqueous electrolyte, wherein an activated carbon with a specific surface area in the range of 960 m²/g to 2000 m²/g is used as said negative electrode current collector.

5. The lithium battery as claimed in claim 4, wherein a fibrous activated carbon is used as said negative electrode current collector.

6. The lithium battery as claimed in claim 4, wherein said positive electrode employs a lithium-containing transition metal oxide as a positive-electrode material.

7. A lithium battery comprising a positive electrode, a negative electrode with a negative electrode current collector retaining lithium metal, and an aqueous electrolyte, wherein a graphitized carbon is used as said negative electrode current collector, and wherein said graphitized carbon has a spacing $d_{002}$ of lattice planes (002) in the range of 3.35 Å to 3.43 Å.

8. The lithium battery as claimed in claim 7, wherein said graphitized carbon has a spacing $d_{002}$ of lattice planes (002) in the range of 3.35 Å to 3.36 Å.

9. The lithium battery as claimed in claim 7, wherein said positive electrode employs a lithium-containing transition metal oxide as a positive-electrode material.

10. A lithium battery comprising a positive electrode, a negative electrode with a negative electrode current collector retaining lithium metal, and an aqueous electrolyte, wherein a graphitized carbon is used as said negative electrode current collector, and wherein said graphitized carbon contains crystallite whose size along the c-axis length (Lc) is not less than 40 Å.

11. The lithium battery as claimed in claim 10, wherein said positive electrode employs a lithium-containing transition metal oxide as a positive-electrode material.

12. A lithium battery comprising a positive electrode, a negative electrode with a negative electrode current collector retaining lithium metal, and an aqueous electrolyte, wherein a graphitized carbon is used as said negative electrode current collector, and wherein said graphitized carbon contains crystallite whose size along the c-axis length (Lc) is not less than 700 Å.

13. The lithium battery as claimed in claim 12, wherein said positive electrode employs a lithium-containing transition metal oxide as a positive-electrode material.

* * * * *